July 9, 1957 — S. J. BERGER ET AL — 2,798,324

DISPLAY DEVICE

Filed April 30, 1956 — 2 Sheets-Sheet 1

Inventors:
Sol J. Berger
John G. Rivenburgh
By Morris Spector
Attorney

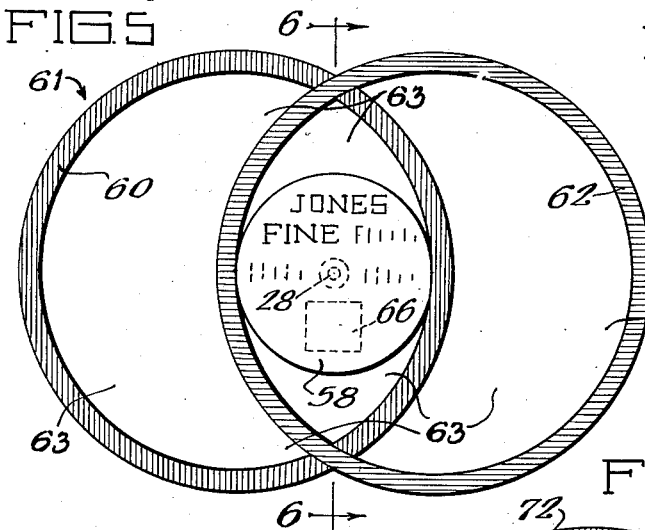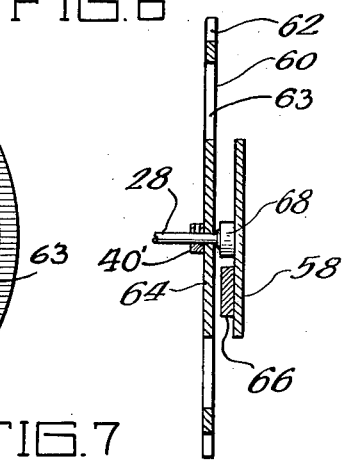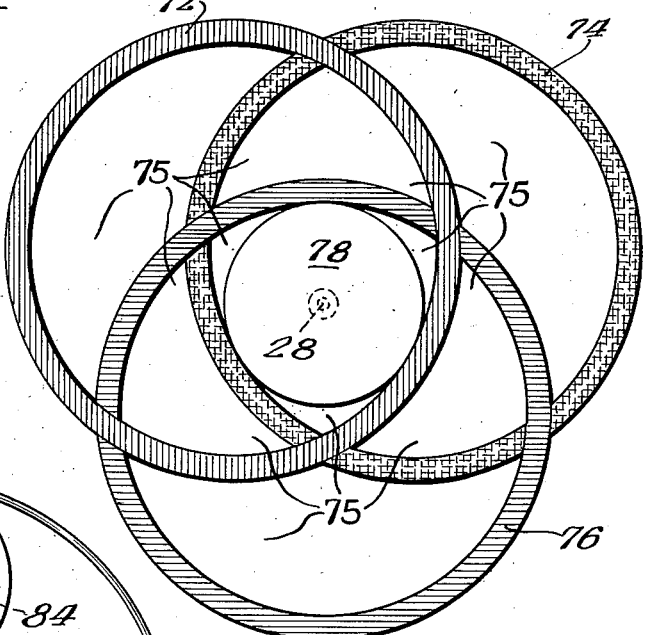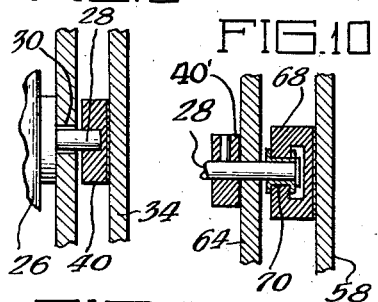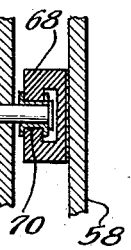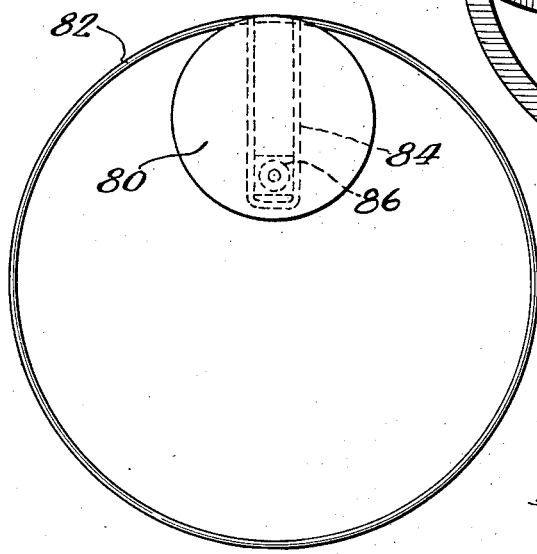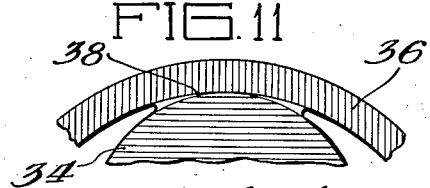

United States Patent Office 2,798,324
Patented July 9, 1957

2,798,324
DISPLAY DEVICE

Sol J. Berger and John G. Rivenburgh, Chicago, Ill., assignors to Berger-Rivenburgh, Chicago, Ill., a copartnership Application April 30, 1956, Serial No. 581,460

5 Claims. (Cl. 40—139)

This invention relates to an animated or moving display or advertising device which is intended to attract attention by creating an optical illusion of a complicated motion.

It is one of the objects of the present invention to provide a display device which is simple and economical of construction and which will attract and hold the attention of an observer by creating an optical illusion of a complex motion while, as a matter of fact, the motion is exceedingly simple. It is a further object of the present invention to provide a display device wherein a simple rotary motion imparted to a single member creates the illusion of a complicated rolling motion of several parts, one with respect to the other, so that two relatively immovable parts appear to have relative motion.

In accordance with one of the principles of the present invention, an illusion of animation is produced wherein a disc or ring appears to be rolling within another ring or over another ring while the two members that appear to be rolling one within or one over the other are, as a matter of fact, one rigid structure.

It is a further object of the present invention to provide an animated rotary device wherein two or more parts thereof which are, as a matter of fact, integral with one another appear to be moving with respect to one another and thus arouse in the observer the question as to how one or more of these parts is supported. It is a still further object of the present invention to provide an animated display device of the above-mentioned character which is extremely simple of construction and inexpensive to manufacture. The device itself, which may be mounted on any electrically driven rotary shaft, may, in its simplest form, be made by a simple cutting or printing operation on a simple sheet of inexpensive material, such as cardboard.

The attainment of the above and further objects of the present invention will be apparent from the following specification taken in conjunction with the accompanying drawings forming a part thereof.

In the drawings:

Figs. 3, 4 and 5 are front elevational views of modified forms of rotary structure that may be used in the display device of Figs. 1 and 2;

Fig. 6 is a sectional view taken along the line 6—6 of Fig. 5 and looking in the direction of the arrows;

Fig. 7 is a front view of still another structure that may be used on the display device of Figs. 1 and 2;

Fig. 8 is a front elevational view of a still further modification;

Fig. 9 is an enlarged sectional view of the means for mounting the rotary structure on the rotary shaft in a device such as is shown in Figs. 1, 2, 3, 4 and 7;

Fig. 10 is an enlarged sectional view of the means for mounting the structure of Fig. 6 on the rotary shaft; and Fig. 11 is an enlarged fragmentary front view of a portion of the device of Fig. 1, the same being illustrative also of a portion of the structures of Figs. 3, 4, 5 and 7.

Reference may now be had more particularly to the drawings wherein like reference numerals designate like parts throughout.

Figure 1:
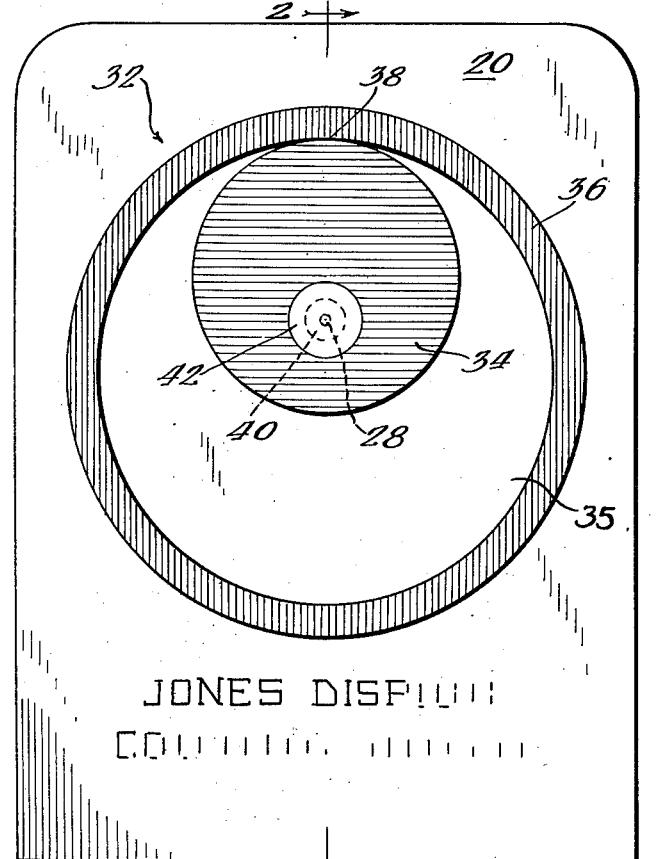
Fig. 1 is a front elevational view of an advertising display device embodying the present invention.
Figure 2:
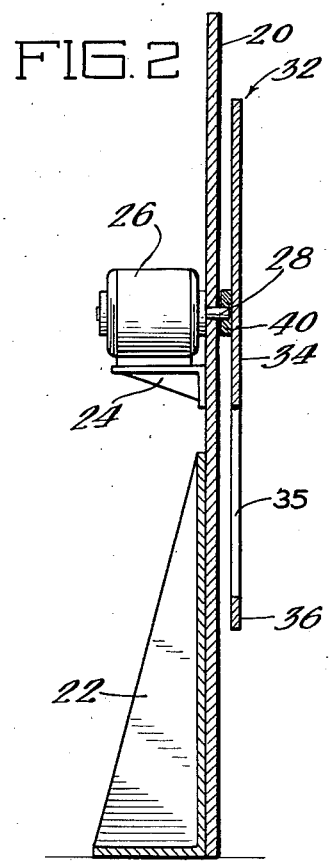
Fig. 2 is a vertical sectional view taken along the line 2—2 of Fig. 1 and looking in the direction of the arrows.

In the device illustrated in Figs. 1 and 2 there is shown a sign panel 20 having at the rear thereof a suitable support member 22 which may be of any preferred and conventional construction. The panel may have suitable advertising matter printed thereon. Mounted on the rear of the panel 20, by a bracket 24 or other suitable support, is a small electric motor 26 which may be of any preferred type such as is commonly used for driving small animated displays such as, for instance a battery motor or a synchronous motor. A rotatable motor shaft 28 is driven by the motor, in this instance at 120 revolutions per minute, through a suitable step-down gearing, which may be in the same casing that houses the electric motor. The shaft 28 extends forward through the panel 20, which is suitably apertured at 30 (Fig. 9) so that the rotary shaft may freely extend therethrough. On the forward end of the shaft 28, in front of the panel 20, is secured an attention-attracting structure 32 of the present invention. This structure, in the embodiment illustrated in Figs. 1 and 2, consists of a single sheet of stiff material, such as cardboard, pasteboard, corrugated paper, or the like, which has been stamped or cut to form a circular disc 34 and a circular ring 36 both constituting one unitary sheet of material. The material between the disc and the ring is cut away, leaving an opening 35. The disc is tangent to the ring and integral therewith at their point of tangency. The internal diameter of the ring 36 is greater than the diameter of the disc 34 so that the disc is eccentric within the ring 36. The ring 36 is of uniform width throughout its circumference. The disc 34 and the ring 36 are of different colors and while the tangency 38 is theoretically a point, they are joined over a small arcuate extent and to that effect the disc 34 may actually overlap the inner circumference of the ring 36 by a small amount or, if the colored surface 34 is tangent to the inner circumference of the ring, there is some material left between the ring and the disc on opposite sides of the point of tangency, which material may be of the color of the ring or of the disc, or preferably may be of a neutral color to be unnoticed, as illustrated in Fig. 11. The two figures may thus appear to be very slightly distorted at their point of contact as, for instance, a rubber tired wheel appears to be distorted at its point of contact with a surface on which it rolls. As stated above, the disc 34 and the ring 36 constitute one unitary sheet of paper formed by stamping or cutting away the material between them, as is evidenced from Figs. 1 and 2. If desired, the material between them need not be cut away but need merely be colored the same color as the front of the display panel 20, the ring 36 and the disc 34 being of colors different from one another which are imprinted on a sheet or disc of the same color as the color of the front of the panel 20.

Mounted on the back of the disc 34, in any desired manner, as by a suitable adhesive, is a grommet or bushing 40 of rubber or the like, having a central opening adapted to be press fitted onto the end of the shaft 28 to hold the structure 32 on the shaft for rotational movement therewith. This is merely illustrative, as any other means may be provided for securing the structure 32 onto the shaft 28. The grommet 40 is located so as to mount either the disc 34 or the ring 36 eccentrically on the shaft or, as is preferred in the structure of Fig. 2, to mount both the disc and the ring eccentrically on the shaft. In this construction, the eccentricity of the disc 34 is comparatively great and the eccentricity of the ring 36 is small. In this construction, the center of rotation of the structure 32 coincides substantially with the center of gravity of the rotating structure. A circle 42 concentric with the shaft 28 may be added to the disc 34 for the purpose of ornamentation. This circle may be formed merely by printing on the disc 34.

A casual inspection of the static condition of the structure 32 gives a general first glance appearance of a device in which the inner edge of the ring 36 appears to be separate from and balanced upon and supported by the disc 34. When the motor rotates the structure 32 the effect is determined by the speed range of rotation. For instance, at a very slow speed, say less than six revolutions per minute, it becomes obvious that the structure 32 is a unitary assembly and there is no relative motion between the ring 36 and the disc 34. This may be due to the fact that at such low speed the eye is able to follow the exact motion of the individual segments of the ring 36 and the disc 34, particularly at their point of tangency, and thus to observe that the entire structure 32 rotates as a single unit. At higher speeds, however, this effect is lost and while the eye may follow the motion of the disc 34 around the axis 28, it does not follow the rotary motion of the ring 36 about that axis. The ring 36 appears to have only its motion of eccentricity so that the ring 36 appears to be rolling about the disc 34 or the disc 34 appears to be rolling within the ring 36 and imparting a motion thereto which is wobbly, similar to the movement of the ring of an eccentric. To the lay observer, there is an attractive or puzzling fascination about this motion in that it raises the puzzling question as to how the ring 36 is supported.

Figure 3:
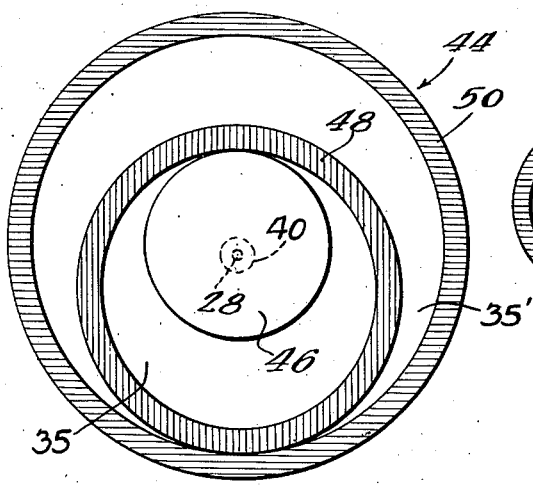

Fig. 3 shows another embodiment of the present invention. In this embodiment a ring 50 may be said to correspond to the ring 36 and a combination ring 48 and disc 46 may be said to correspond to the disc 34 of Fig. 1. The structure 44 constitutes a single sheet of paper cut away at 35, as before, leaving the disc 46 and the ring 48 joined at their point of tangency as in Fig. 11, and the material is further cut away at 35' leaving the ring 48 and the ring 50 joined at their point of tangency in the same manner as is illustrated in Fig. 11. The points of tangency of the ring 48 and the disc 36 with the ring 50 are preferably 180° apart, although a different angular displacemane may be used or there may be no angular displacement. In this embodiment, the grommet 40 which mounts the structure on the shaft 28 is eccentric of the disc 46 and of the ring 48 and is centered with respect to the ring 50. It may be located in a position eccentric of all three, namely, eccentric of the disc 46, ring 48 and ring 50, or it may be centered with respect to any one of those three circular members which would make it eccentric of the other two. When this assembly is rotated about the shaft 28 at the proper speed the ring 48 appears to be rolling around the disc 46 as in Fig. 1, and at the same time the ring 50 appears to be rolling around the ring 48. The up and down and to and fro movement of the ring 48 appears to occur in the annulus of the ring 50. When the grommet 40 is located eccentric of the center of the ring 50 and the structure 44 is rotated at a proper speed, the appearance is one or both rings 48 and 50 having eccentric motion accompanied by a rolling motion of the ring 48 within the ring 50.

When the center 28 coincides with the center of the ring 50, the ring 48 appears to be bouncing or rolling within the ring 50. It is thus apparent that the same effect can be obtained in the structure of Figs. 1 and 2 by printing on the panel 20 a ring similar to the ring 50, which printed ring would have its center at the axis of the shaft 28 and its inner periphery tangent to the outer periphery of the ring 36 of Fig. 1.

Figure 4:
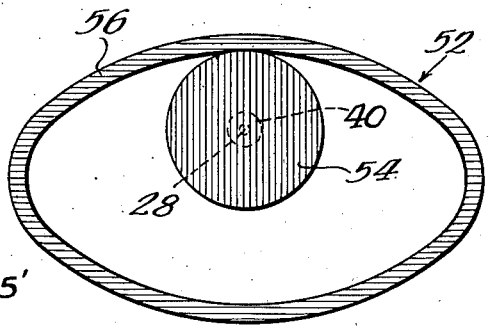

Fig. 4 shows, at 52, a unitary structure comprising an elliptical ring 56 and a circular disc 54. This structure is similar to the structure of Fig. 1, except that the ring 56 which corresponds to the ring 36 of Fig. 1 is here made elliptical instead of circular. In this case the disc 54, which corresponds to the disc 34 of Fig. 2, has the grommet 40 thereon mounted centrally thereof. Either a central or eccentric mounting of the grommet may be used.

Reference may now be had more particularly to Figs. 5 and 6 which show still another embodiment of the present invention. In this embodiment, the attention-attracting structure 61 which corresponds to the structure 32 of Fig. 1 has two rings 60 and 62 which correspond to the rings 36 of Fig' 1 and are joined by a circular disc 64 that corresponds to the disc 34 of Fig. 1. In this structure the rings 60, 62 and the disc 34 all constitute one piece of cardboard, pasteboard or the like, from which the material has been removed at 63, so that when the structure 61 is mounted on the panel 20 the panel is visible through the structure at the openings formed at 63. The front surface of the ring 60 is of a color distinctly different from the color of the front surface of the ring 60 is of a color distinctly different from the color of the front surface of the ring 62. A grommet 40' which may be of rubber or the like and corresponds to the grommet 40 of Fig. 1 is secured to the back of the disc 64 in any desired manner, as by cementing, being in this instance secured to the disc at the center thereof. This grommet has a centrally located mounting hole whereby it may be slipped onto the shaft 28 and grips the shaft by frictional engagement therewith, so that upon rotation of the shaft the structure 61 rotates with the shaft. When this structure is rotated at a suitable speed, there is produced an illusion of the two rings 60 and 62 rolling around the disc 64 with the forward appearing ring 62 passing over and in front of the rearward appearing ring 60, each ring appearing to have its one eccentric motion independent of the other. In addition, there is, optionally, here provided means for producing an additional optical illusion. Here the rotary shaft 28 extends through the grommet 40' and through the disc 64. At its forward end the rotary shaft 28 supports a disc 58 by means of a bearing 68 that is secured to the disc 58 and is journalled on the shaft 28. The disc 58 is weighted, at the back thereof, by a weight 66 so that upon rotation of the shaft 28 the disc 58 does not rotate with the shaft. The disc 58 may contain printed advertising matter thereon which, of course, remains legible even when the structure 61 is being rotated about the shaft 28.

If the disc 58 is made of precisely the same diameter as the disc 64 it completely covers the disc 64 and the two rings 60—62 appear to be rolling with respect to one another around the stationary disc 58. If the disc 58 is made of smaller diameter than the disc 64, exposing a part of the disc 64, the exposed part of the disc is made of a color different from that of the disc 58 and different from the colors of the rings 60 and 62, and those rings then appear to be wobbling around the periphery of the disc 64 with an eccentric-like motion.

In Fig. 7 there is shown a structure corresponding to the structure of Fig. 5 except that instead of two rings 60 and 62 of Fig. 5 displaced 180° apart there are here provided three rings 72, 74 and 76 which are each of the same diameter and their centers spaced at the corners of an imaginary equilateral triangle. The disc 78 which corresponds to the disc 64 of Fig. 6 is tangent to all three rings 72, 74 and 76. The three rings and the disc 78 comprise a single sheet from which the material at 75 has been stamped out and removed. The rings 72, 74 and 76 are each of different colors, the coloring being such that the ring 72 appears to be the uppermost ring, the ring 76 appears to be the center ring and the ring 74 the lowermost ring. The structure of Fig. 7 may be mounted on the shaft 28 in the manner illustrated in Figs. 2 and 9, or in the manner illustrated in Figs. 6 and 10.

In each of the embodiments hereinabove described the disc and the ring or rings of the rotating structure are each of colors different from one another and in each case they constitute one integral structure. In each case they may be made by cutting out the material, as pointed out above, or they may be formed by printing the disc and the ring or rings of their characteristic colors upon a surface of a different color without any stamping operation. The surface upon which the printing is performed may, in the case of the structures of Figs. 1 and 3, be a circular member of an outside diameter exactly equal to the outside diameter of the printed outer ring. However, in the case of each of the embodiments hereinabove described, the surface upon which the printing is performed may be any sheet of material, for instance, paper or cardboard, or more rigid material if desired, which may be of any particular shape and is then mounted for rotation with respect to the printed rings and discs in the manners previously described. In such case, it may be desired to mount, in front of the rotating structure, a masking panel that masks the edges of the rotating surface but has a hole or opening therein through which is exposed the printed rings and disc or discs as the same rotates.

In Fig. 8 there is shown still another embodiment of the present invention, somewhat similar to Fig. 1 but illustrating the fabrication of the device wherein the central disc 80 and the surrounding ring 82 are of different materials, the latter of wire and the former of cardboard, the ring 82 being secured to the disc 80 by a wire loop 84 at the back of the disc 80, which loop is welded to the ring 82, the joint being covered by the disc 80. The sides of the wire loop 84 are parallel to one another and provide a support for a grommet 86. The grommet 86 is of rubber material as in the case of the grommet 40, with a central opening for receiving and frictionally gripping the rotary shaft 28. The grommet is frictionally engaged by the sides of the U-shaped loop 84 and may be manually slid in the loop to any desired position where it is held by the frictional pressure engagement of the sides of the loop of the wire 84 with the grommet. There is thus provided a simple means of adjusting the position of the grommet with respect to the center of the disc 80 and also with respect to the center of the disc 82, so that the eccentricity of the rotating mass may be adjusted as desired. This feature may be incorporated in the other embodiments here shown.

In compliance with the requirements of the patent statutes we have here shown and described a few preferred embodiments of our invention. It is, however, to be understood that the invention is not limited to the precise constructions here shown, the same being merely illustrative of the principles of the invention. What are considered new and desired to secure by Letters Patent are:

1. A display device comprising a shaft, means for rotating the shaft, and an attention-attracting figure assembly on the shaft, said figure assembly comprising at least one ring-shaped figure, and a disc located within and integral with the ring-shaped figure, the disc being mounted on the shaft and of a substantially smaller diameter than the internal diameter of the ring-shaped figure substantially tangent to the inner edge of the ring-shaped figure, whereby upon rotation of the shaft there is created an illusion of translational motion of the ring-shaped figure with respect to the disc.

2. A display device comprising a shaft, means for rotating the shaft, and an attention-attracting figure assembly on the shaft, said figure assembly comprising at least one ring-shaped figure eccentrically secured to the shaft, a disc mounted on the shaft and of a diameter such as to be substantially tangential to the inner edge of the ring-shaped figure, and a second ring-shaped figure surrounding and tangentially secured to the first figure, whereby the first ring-shaped figure appears to undergo rolling and translational motion bounded by the disc and the second ring-shaped figure.

3. A display device comprising a shaft, means for rotating the shaft, and an attention-attracting figure assembly on the shaft, said figure assembly comprising a disc secured to the shaft to rotate therewith, and a circular ring figure of larger inner diameter than the outer diameter of the disc surrounding the disc and having its inner edge substantially tangent to, and secured to, the outer edge of the disc, the point of securing of the disc to the shaft being eccentric with respect to both the disc and the ring figure.

4. The device of claim 3 wherein the figure assembly further comprises an additional circular ring figure surrounding the first ring figure and having its inner edge substantially tangential to, and secured to, the outer edge of the first ring figure.

5. A display device comprising a shaft, means for rotating the shaft, and an attention-attracting figure assembly on the shaft, said figure assembly comprising a disc eccentrically secured to the shaft, and a circular ring figure of larger diameter surrounding the disc and having its inner edge substantially tangential to, and secured to, the outer edge of the disc.

References Cited in the file of this patent

UNITED STATES PATENTS

| | | |
|---|---|---|
| 489,027 | McDonald | Jan. 3, 1893 |
| 795,470 | Anger | July 25, 1905 |
| 1,725,851 | Craig | Aug. 27, 1929 |
| 2,324,343 | Wharton | July 13, 1943 |
| 2,513,100 | Muri | June 27, 1950 |
| 2,527,803 | Fleak | Oct. 31, 1950 |

FOREIGN PATENTS

| | | |
|---|---|---|
| 214,284 | Great Britain | Apr. 22, 1924 |
| 230,606 | Germany | Jan. 31, 1911 |
| 601,037 | Germany | Aug. 7, 1934 |
| 837,805 | Germany | May 2, 1952 |
| 1,017,343 | France | Sept. 17, 1952 |
| 1,036,809 | France | Apr. 29, 1953 |
| 1,072,653 | France | Mar. 17, 1954 |